(12) United States Patent
Staelin et al.

(10) Patent No.: US 7,481,509 B2
(45) Date of Patent: Jan. 27, 2009

(54) INK THICKNESS CONSISTENCY IN DIGITAL PRINTING PRESSES

(75) Inventors: Carl Staelin, Haifa (IL); Ruth Bergman, Haifa (IL); Mani Fischer, Haifa (IL); Darryl Greig, Haifa (IL); Marie Vans, Shefar-am (IL); Gregory Braverman, Ramat-Gan (IL); Shlomo Harush, Nes-Ziona (IL); Eyol Shalef, Tal Aviv (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 802 days.

(21) Appl. No.: 10/698,667

(22) Filed: Oct. 31, 2003

(65) Prior Publication Data
US 2005/0093907 A1   May 5, 2005

(51) Int. Cl.
*B41J 2/205* (2006.01)
(52) U.S. Cl. .......................................... 347/15; 347/14
(58) Field of Classification Search .................... 347/15, 347/43, 19
See application file for complete search history.

(56) References Cited

U.S. PATENT DOCUMENTS

| | | | | | |
|---|---|---|---|---|---|
| 5,357,448 | A | * | 10/1994 | Stanford | 382/112 |
| 5,666,615 | A | * | 9/1997 | Nguyen | 399/240 |
| 5,967,049 | A | * | 10/1999 | Seymour et al. | 101/484 |
| 6,314,263 | B1 | * | 11/2001 | Yoshida et al. | 399/286 |
| 6,499,821 | B1 | * | 12/2002 | Nozawa | 347/14 |
| 2005/0083540 | A1 | * | 4/2005 | Hersch et al. | 358/1.9 |

FOREIGN PATENT DOCUMENTS

| | | |
|---|---|---|
| EP | 0613062 | 8/1994 |
| JP | 05150601 | 6/1993 |
| JP | 10090961 | 4/1998 |
| JP | 11143164 | 5/1999 |

* cited by examiner

*Primary Examiner*—Thinh H Nguyen

(57) ABSTRACT

A method for a digital printing press includes estimating a developer voltage by applying a developer voltage estimation model to measurements of state parameters of the digital printing press.

23 Claims, 4 Drawing Sheets

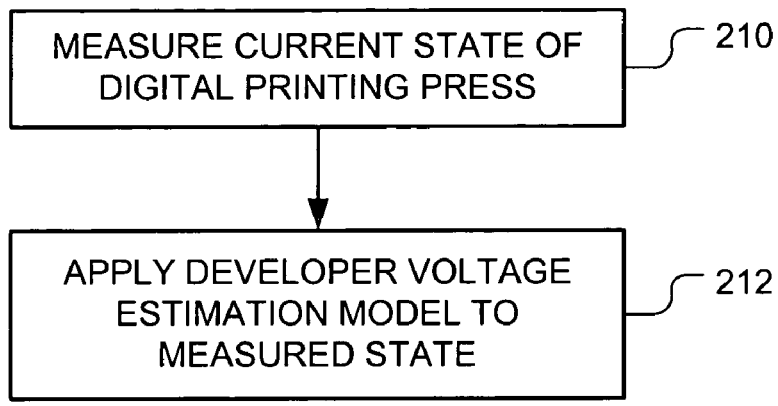
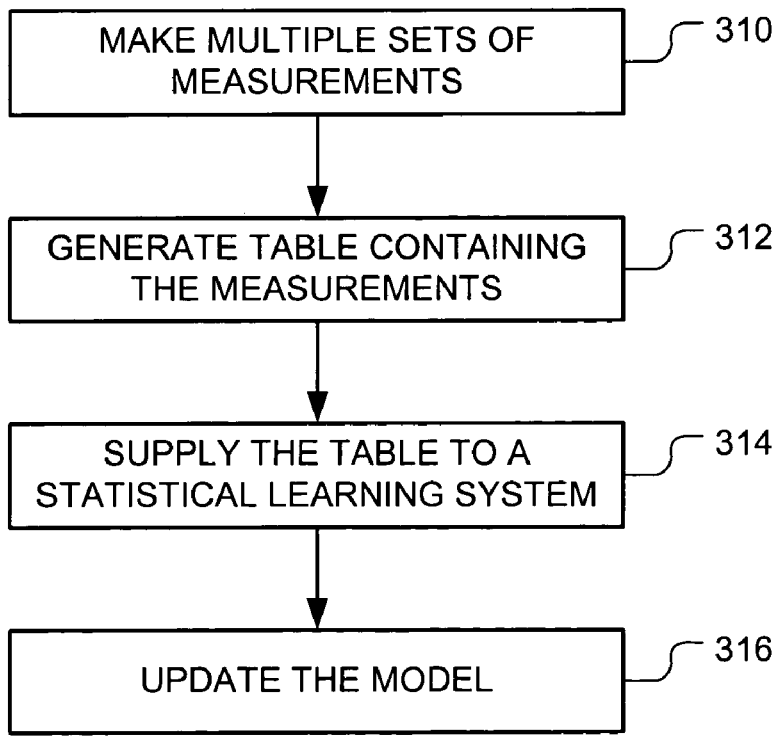

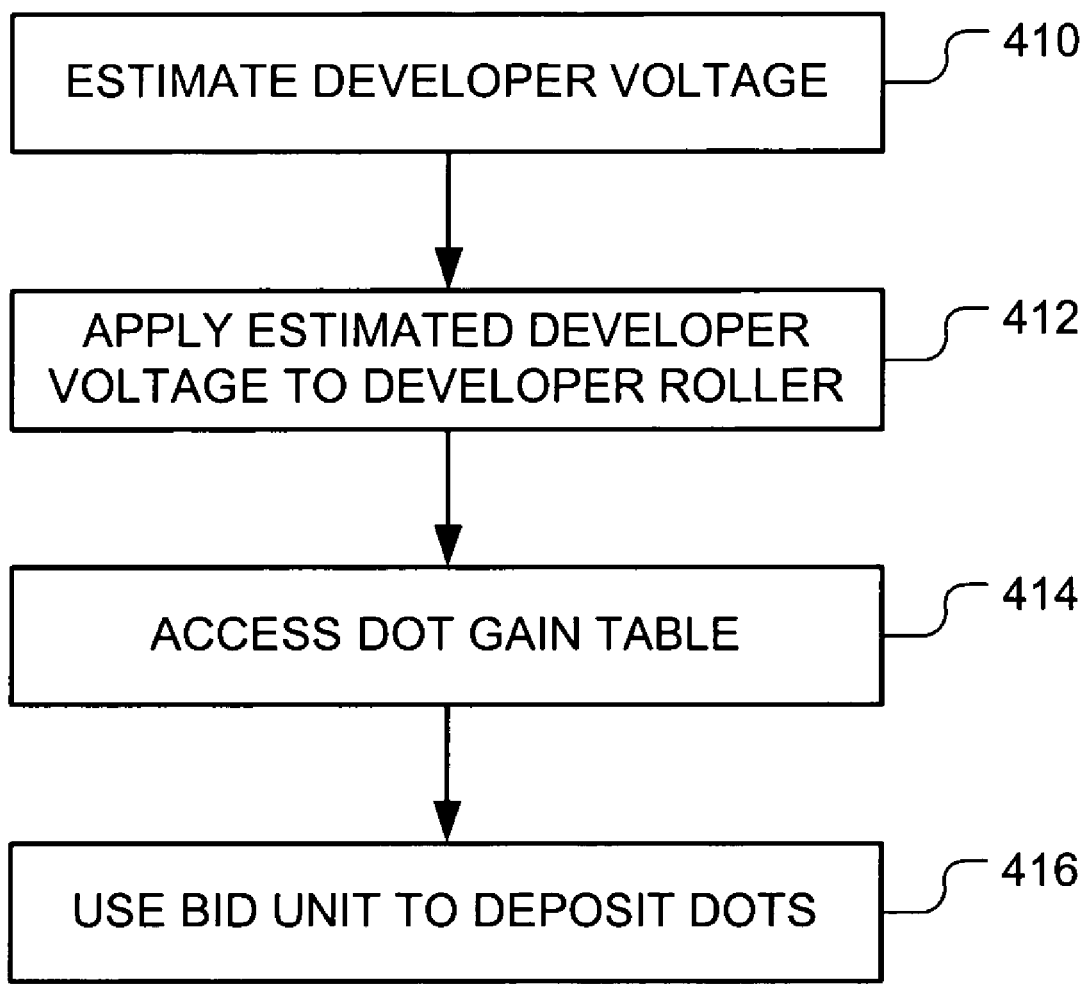

INK THICKNESS CONSISTENCY IN DIGITAL PRINTING PRESSES

BACKGROUND

The HP Indigo line of digital printing presses is based on digital offset color technology, which combines ink-on-paper quality with multi-color printing on a wide range of paper, foil and plastic substrates. These digital printing presses offer short-run printing, on-demand service and personalization, all at an affordable price.

Color consistency is important in digital printing presses. When a digital printing press makes many prints of an image, the first print in a run should be the same as the last print in the run, which should be the same as a print made two weeks later, which should be the same as a print made six months after that. However, colors can shift over time due to drift in the printing press. One consequence is that dots are not printed at their commanded sizes. The physical (printed) dot size is different than the digital dot size (that is, the dot size that should have been printed).

Dot gain tables can be used to improve color consistency. A dot gain table relates physical dot size to digital (commanded) dot size. During printing, the digital printing press uses dot gain tables to select or interpolate digital dot sizes that produce the dots of the proper sizes.

The dot tables can be generated in two stages. The first stage is performed to determine a proper developer voltage setting for each ink. The digital printing press prints a first set of the test patterns, and these test patterns are used to determine a developer voltage that produces the desired ink thickness. The ink thickness can be inferred from optical density at 100% print coverage. For example, a test pattern is printed at a constant developer voltage and 100% coverage, and the optical density of the test pattern is measured. If the optical density is less than desired at 100% print coverage, the developer voltage is increased, a new test pattern is printed, and optical density of the new test pattern is measured. The steps of searching for a new developer voltage, printing a new test pattern at the new developer voltage, and measuring optical density are repeated until a test pattern is printed with 100% ink coverage.

A developer voltage that produces the desired ink thickness is determined for each ink. If the digital printing press uses seven different inks, seven different developer voltages are determined. Thus the steps of searching for a new developer voltage, printing a new test pattern, and measuring optical density are performed for each ink.

Once the developer voltages are set to produce the desired ink thickness, the second stage is performed. Multiple sheets of test patterns with monochromatic swatches of uniform digital dot area are printed, and the physical dot area for each of the digital dot areas is measured. These dot areas are added to the dot gain tables.

Printing and measuring the many test patterns can be time consuming and a waste of ink and print substrates. A faster, less expensive, more efficient method of generating the dot gain tables is desirable.

SUMMARY

According to one aspect of the present invention, a method for a digital printing press includes estimating an ink thickness control parameter (e.g., developer voltage) based on current and past measurements of a state of the digital printing press.

According to another aspect of the present invention, printing apparatus includes a print engine for depositing ink at a thickness that is determined in part by a control parameter. The printing apparatus estimates the control parameter by applying an estimation model to a current measurement of a state of the printing apparatus.

According to yet another aspect of the present invention, a model of developer voltage is generated from past measurements of developer voltage and certain state parameters of a digital printing press. This model can be used to estimate developer voltages based on a current state of the digital printing press.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a method of estimating developer voltage in accordance with an embodiment of the present invention.

FIG. 3 is an illustration of a method of generating a developer voltage estimation model in accordance with an embodiment of the present invention.

FIG. 4 is an illustration of a method of using estimated developer voltage in accordance with an embodiment of the present invention.

DETAILED DESCRIPTION

Figure 1:
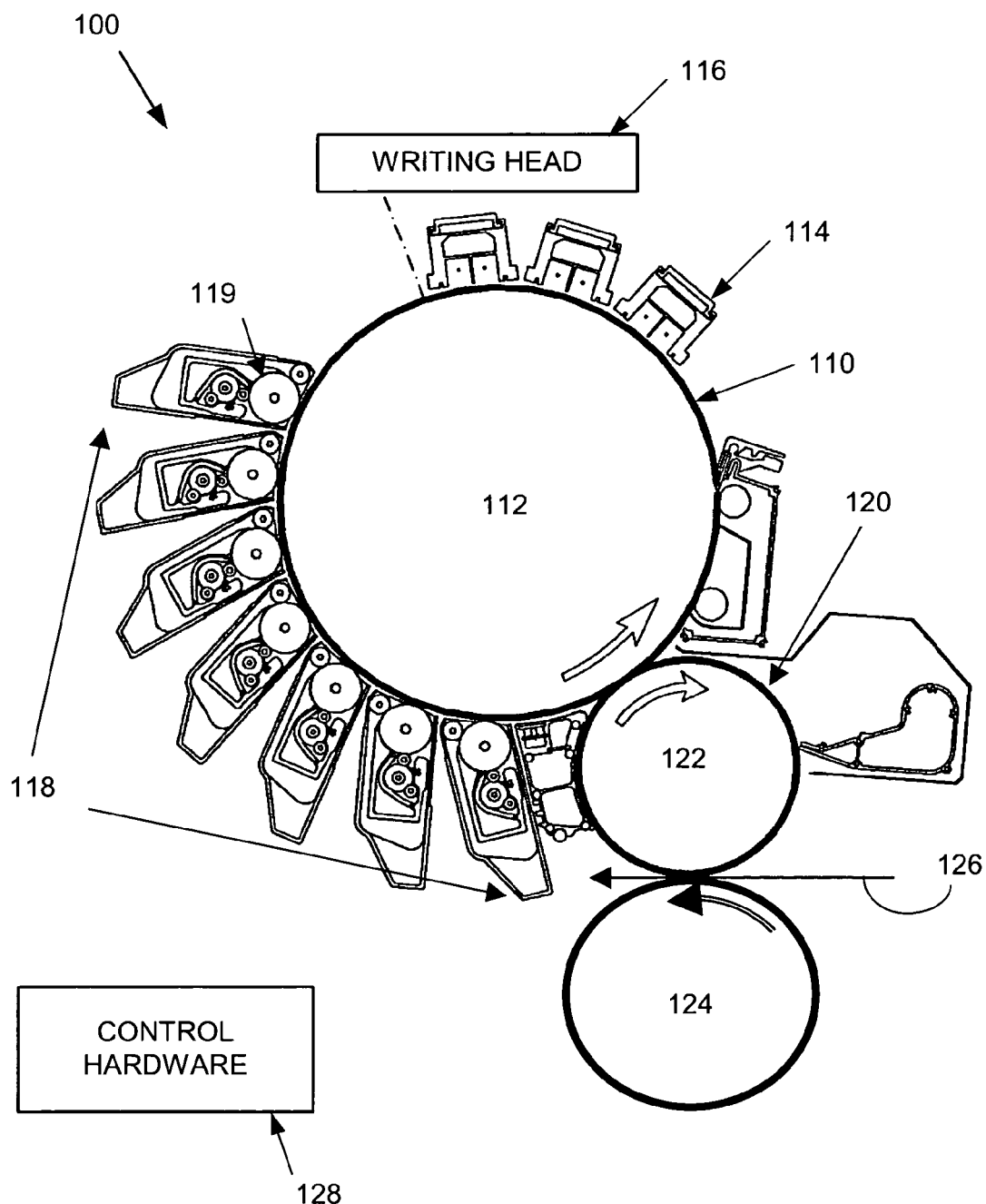
FIG. 1 is an illustration of a digital printing press in accordance with an embodiment of the present invention.

Reference is made to FIG. 1, which illustrates an exemplary digital printing press 100. The digital printing press 100 includes a Photo Imaging Plate (PIP) foil 110 wrapped around a PIP drum 112, and a plurality of Binary Ink Development(BID)units 118 disposed about the PIP drum 112. The PIP foil 110 includes photoconductive material.

Each BID unit 118 contains a single ink, but the different BID units 118 may contain inks of different colors. For example, the seven BID units 118 of FIG. 1 contain a total of seven different inks.

The digital printing press 100 may produce a print as follows. The PIP foil 110 is charged by a Scorotron assembly 114. As the PIP drum 112 is rotated, a writing head 116 produces a laser beam that discharges specific areas on the PIP foil 112. These discharged areas define a latent image.

One BID unit 118 applies ink to the foil 110 during each rotation of the PIP drum 112. A BID unit 118 is moved near the foil 110. The BID unit 118 includes a developer 119, which is charged to a lower potential than the charged areas on the PIP foil 110, and a larger potential than the discharged areas on the PIP foil 110. Charged ink in the BID unit 118 is attracted to the discharged areas on the foil 110. Dots of the ink are transferred from the developer roller 119 to the discharged areas. Ink is not transferred to those foil areas having higher potential than the developer roller 119. In this manner, ink is deposited on the PIP foil 110. As the PIP drum 112 is rotated, a color plane of the image is formed on the PIP foil 110.

With each additional rotation of the PIP drum 112, the writing head 116 discharges specific areas on the foil 110, and another BID unit 118 applies ink to the discharged areas. In this manner, a developed image is formed on the foil 110.

The developed image is transferred from the PIP foil 110 to a blanket 120, which is wrapped around an Intermediate Transfer Member (ITM) 122. The transfer of the developed image is achieved through electrical and mechanical forces. The blanket 120 is charged and heated to raise the temperature of the ink on the blanket 120. The increase in temperature causes the ink to swell and acquire a gelatin-like form. With the help of another drum 124, the developed image is transferred from the blanket 120 to a substrate 126 (i.e., a print medium).

The digital printing press 100 includes sensors (not shown) for measuring various parameters of the digital printing press 100. These parameters may include ink density, ink conductivity, ink temperature, ink separation, imaging oil temperature, imaging oil dirtiness, ITM temperature, and ITM blanket counter (a measure of blanket age or usage, such as a number of impressions made by the blanket 120 since it was installed), corona voltage (the voltage of the corona in the Scorotron assembly 114), grid voltage (the voltage of a grid in the Scorotron 114 assembly), and vlight/vbackground (the voltage on the PIP foil 110 after/before the foil 110 is discharged). Another parameter is developer voltage.

Some of these parameters are used to control the digital printing press 110. Control hardware 128 of the digital printing press sets target values for the control parameters, and maintains the control parameters at or near their target values.

The developer voltage, which is applied to the developer roller 119 inside the BID unit 118, controls the thickness of the ink dots that are deposited on the discharged areas of the foil 110. Increasing the developer voltage increases the thickness of the ink dots.

The different inks in the BID units 118 may have different physical characteristics. Consequently, the same developer voltage might not cause all of the inks to be deposited at the same thickness. Therefore, a separate developer voltage is determined for each BID unit 118. For example, the seven BID units 118 of FIG. 1 are controlled at seven different developer voltages.

The developer voltages are determined prior to making a run of prints. However, instead of determining developer voltages through a time consuming, expensive and wasteful calibration procedure, the developer voltage is estimated.

A method of estimating a single developer voltage will now be described. The method can be used to estimate a developer voltage for each of the BID units 118 in the digital printing press 100.

With additional reference to FIG. 2, a developer voltage may be estimated by measuring the "current state" of the digital printing press (210), and applying a developer voltage estimation model to the measured current state (212). The "state" of the digital printing press 100 is defined by a set of state parameters. The "current" state may be the most recent measurements of the state parameters of the digital printing press 100. The developer voltage estimation model, which provides an estimate of developer voltage for a desired ink thickness, may be based on past measurements of the same set of state parameters. The control hardware 128 or a processor of the digital printing press 100 may be used to apply the model to the measured current state.

The estimates of developer voltage are generally accurate, even with a simple model derived from linear regression and an adequate number of past measurements of the state parameters. However, generating the estimates is much faster, less expensive and less wasteful than determining the developer voltage by a conventional method.

The method of FIG. 2 may be used to estimate a calibration voltage for each BID unit 118 of the digital printing press 100. Therefore, a separate model may be generated and used for each BID unit 118. For example, seven developer voltage estimation models can be generated and used for a digital printing press 100 having seven BID units 118. The different models may be generated from the same set of past measurements and applied to the same set of current measurements. In the alternative, a single model having ink type as an input may generated and used for all of the BID units 118.

Reference is now made to FIG. 3, which illustrates a method of generating a developer voltage estimation model. Multiple sets of measurements are made (310). Making the measurements may include using the digital printing press 100 to print a variety of monochrome swatches, measuring optical density of the swatches, measuring the developer voltages at the time the swatches were printed, and measuring the set of state parameters at the time the swatches were printed.

The set of state parameters is not limited to any particular state parameters. For example, a set of nineteen parameters can be measured. The set may include parameters such as ink density, ink conductivity, ink temperature, imaging oil temperature, blanket age and ITM temperature. The developer voltage is not a member of the set of state parameters.

Some or all of the measurements may be made by the digital printing press 100. Some or all of the measurements may be made by means other than the digital printing press 100.

An optical densitometer may be used to measure average optical density of each swatch. The optical density measurements may be denoised to improve the accuracy of the measurements.

Each swatch is printed with a single color at a constant developer voltage. The state parameters are also held constant during the printing of a single swatch.

However, the collection of swatches includes swatches printed at different combinations of developer voltages and state parameters. Different swatches may be printed over a range of developer voltages. For example, a first group of swatches is printed at a first developer voltage, a second group of swatches is printed at a second developer voltage, a third group of swatches is printed at a third developer voltage, and so on. Within each group, one or more state parameters are varied from swatch to swatch. For state parameters that do not interact (i.e., state parameters that, if changed, do not alter how a different state parameter affects the system), more than one of those state parameters can be varied from swatch to swatch. Varying more than one state parameter from swatch to swatch can reduce the number of swatches that are printed and measured.

To save paper and time, multiple swatches may be made on the same substrate. For example, many 25 mm×12.5 mm swatches may be printed on a substrate having dimensions of 464 mm×320 mm. Each substrate may include swatches of different separations (inks).

A table containing all of the measurements is generated (312). The table may include a column for developer voltage, a column for optical density, and a column for each state parameter. Each row of the table may contain a set of measurements for the developer voltage, optical density and state parameters.

The table is supplied to a statistical learning system (314). The statistical learning system may use multiple linear regression to generate the model. Such a model includes a single intercept and a slope for each state parameter. Univariate linear regression uses two parameters (a and b), and the output function is f=a*x+b, where a, b, and x are all scalar values. Multi-variate linear regression is a simple extension: f=dot(a, x)+b, where a and x are vectors and b is a scalar. The function dot(a, b) is the vector dot product and its result is a scalar value.

A more sophisticated system involves training a neural network on a set of input vectors. Each input vector includes the state parameters in a row of the table. The resulting model is a trained neural network, having nodes and connection weights that are optimized to reduce the error between the output of the neural network—the estimated developer voltage—and the measured developer voltage. The trained neural network can be applied to the measured current state of the digital printing press 100 by supplying it with an input vector of current state parameter measurements.

Another sophisticated system involves using the measurements to create a support vector machine. Support vector machines are a kernel-based approach to statistical learning. For a description of support vector machines, see for example, Christopher J. C. Burges, "A tutorial on Support Vector Machines for pattern recognition", Data Mining and Knowledge Discovery, 2, pp. 121–167, Kluwer Academic Press, Boston (1998), Nello Cristianini and John Shawe-Taylor, "An Introduction to Support Vector Machines and other kernel-based learning methods" Cambridge University Press, Cambridge UK (2000), and Vladimir Vapnik, "The nature of statistical learning theory, second edition," Statistics for engineering and information science, Springer-Verlag, New York, N.Y. (2000). A support vector machine is also trained on a set of input vectors, where each input vector includes the state parameters in a row of the table. The support vector machine can be applied to the measured current state of the digital printing press 100 by supplying it with an input vector of current state parameter measurements.

Yet another sophisticated learning system involves the "k nearest neighbors." Each neighbor includes the state parameters in a row of the table. A standard "k nearest neighbor" algorithm may be used to produce the estimated developer voltage.

The statistical learning system is not limited to any particular type. Each system has its own advantages. One type of system might perform better than another type of system under some conditions, but not other conditions.

Additional measurement sets may be taken after the model has been generated. For example, measurements may be made during normal operation of the digital printing press 100 and during additional calibration procedures. These additional measurements may be added to the table, and the updated table may be supplied to the statistical learning system. In this manner, the developer voltage estimation model is updated (316).

Reference is now made to FIG. 4, which illustrates an example of using a BID unit 118 to deposit a color plane on the PIP foil 110. Prior to printing, the developer voltage for that BID unit 118 is estimated (410), and the estimated developer voltage is applied to the developer roller 119 (412). This developer voltage is maintained at or near its estimated value throughout the deposition of the color plane. A dot gain table is accessed to determine the digital dot areas that will produce the desired coverage (414).

As the PIP drum 112 is rotated, the writing head 116 discharges areas on the PIP foil 110 and, while being controlled at the estimated developer voltage, the BID unit 118 deposits dots on the substrate (416). If the estimated developer voltage is accurate, each dot is produced at a desired thickness The developer voltage is typically estimated prior to making an impression, and can be re-estimated between impressions. However, the developer voltage is not typically changed while making an impression.

Figure 5:
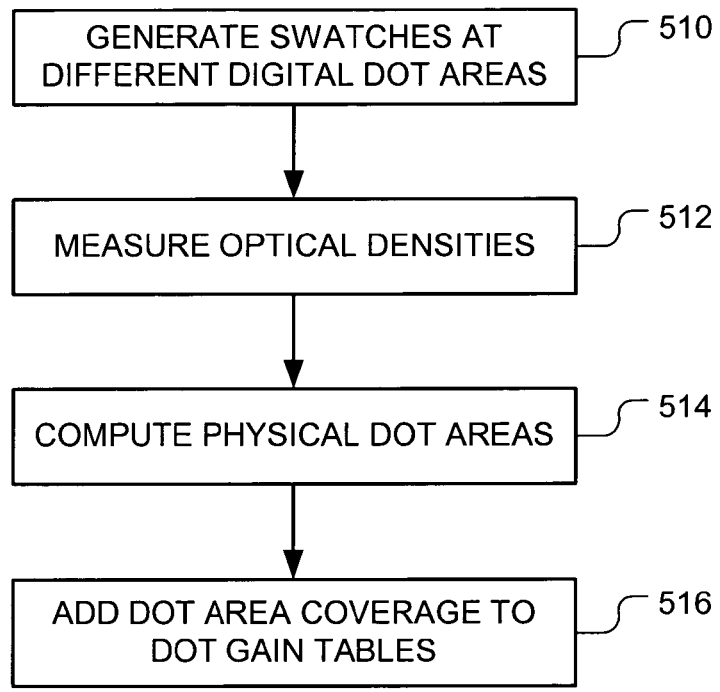
FIG. 5 is an illustration of a method of calibrating a digital printing press in accordance with an embodiment of the present invention.

Reference is now made to FIG. 5, which illustrates an example of using the estimated developer voltage to generate the dot gain tables. Generally, different swatches are generated at different digital dot areas (510). The estimated developer voltage is used to estimate developer voltages that will produce the different ink thicknesses. This can be done by interpolating the developer voltage between 0 and the estimated developer voltage.

The estimated developer voltage can be refined prior to printing the swatches. For example, a test pattern is printed at the estimated developer voltage, and the optical density of the test pattern is measured. If the measured optical density does not match the expected optical density, the estimated developer voltage is adjusted. This process may be repeated to further refine the developer voltage.

Optical density of the swatches is measured (512). The optical density indicates the average area covered by the ink in the swatch.

Physical dot areas are computed from the measured optical densities (514). Dot area coverage is added to the dot gain table (516).

A more sophisticated approach toward generating dot gain tables is disclosed in assignee's patent application U.S. Ser. No. 10/463,371 filed Jun. 16, 2003 and entitled "SYSTEMS AND METHODS FOR DOT GAIN DETERMINATION AND DOT GAIN BASED PRINTING," which is incorporated herein by reference. In that application, measurements of the state of the digital printing press are also used to generate the dot gain table. In some embodiments disclosed in that application, the developer voltage and the optical density are supplied to a statistical learning system, which generates dot gain ratios. As applied to the method of FIG. 5, the developer voltage and the optical density are not supplied as inputs to the statistical learning system.

Figure 6:
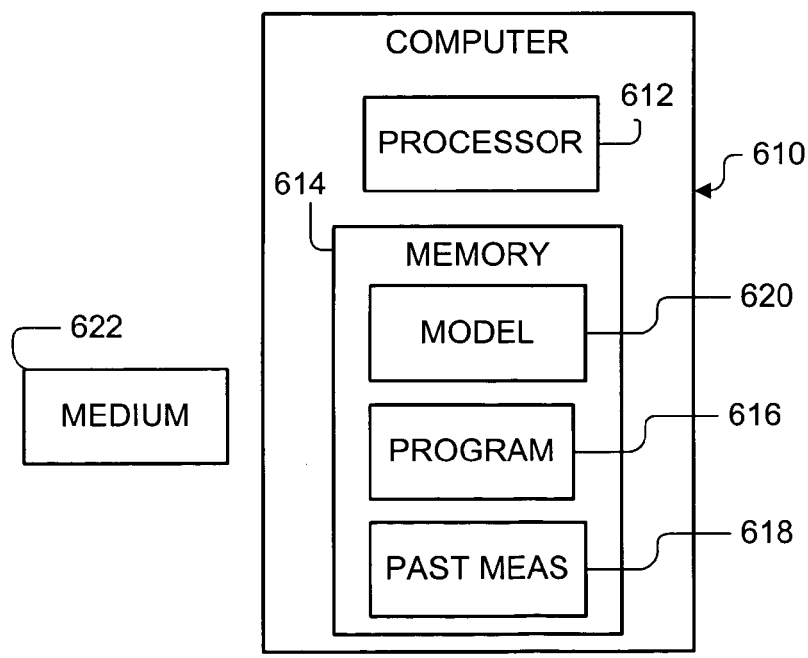
FIG. 6 is an illustration of an apparatus for generating a developer voltage estimation model in accordance with an embodiment of the present invention.

Reference is now made to FIG. 6, which illustrates a machine 610 for generating the developer voltage estimation model 620. The machine 610 includes a processor 612 and computer memory 614. The memory 614 stores a program 616 and a table of past measurements 618. The program 616 instructs the processor 612 to use a statistical learning system to generate the developer voltage estimation model 620 from the table of past measurements 618

The machine 610 can be part of the digital printing press 100 or it can be a standalone machine such as a personal computer. If the machine 610 is not a part of the digital printing press 100, the model 620 can be transferred from the machine 610 to the digital printing press 100. For example, the developer voltage estimation model can be stored on removable medium 622 (e.g., a CD ROM), transmitted (e.g., over the Internet), or otherwise transferred.

The methods above are not limited to the digital printing press illustrated in FIG. 1. The methods are applicable to other types of digital printing presses.

The methods above are not limited to any particular set of state parameters. State parameters can vary between different types of digital printing presses. In addition, the methods above are not limited to using the digital printing press to measure the state parameters.

The methods above are not limited to inferring ink thickness by measuring optical density. Other methods may be used to determine the ink thickness.

A digital printing press could have a print engine that deposits ink at a thickness that is controlled by a parameter other than developer voltage. For such a digital printing press, the control parameter is estimated by applying an estimation model to a current state of such a digital printing press.

The present invention is not limited to the specific embodiments described above. Instead, the present invention is construed according to the claims the follow.

The invention claimed is:

1. A method for a digital printing press, the method comprising estimating developer voltage based on past measurements of at least one state parameter of the digital printing press; and applying the estimated developer voltage to a BID unit while using the BID unit to deposit ink dots.

2. A method for a digital printing press, the method comprising estimating developer voltage based on current and past measurements of at least one state parameter of the digital printing press.

3. The method of claim 2, wherein the printing press includes a plurality of different inks, and wherein a developer voltage is estimated for each ink.

4. The method of claim 2, further comprising using the estimated developer voltage to print swatches at different digital dot areas; and for each swatch measuring optical density, computing physical dot area, and adding dot area coverage to a dot gain table.

5. The method of claim 4, wherein the dot gain table is based on past observations of the at least one state parameter of the digital printing press.

6. The method of claim 1, wherein the past measurements are used to generate an estimation model; and wherein the model is applied to the current measurement of the at least one state parameter of the digital printing press.

7. The method of claim 6, further comprising updating the model with additional measurements.

8. The method of claim 1, wherein the estimated developer voltage is also based on current measurements of the at least one state parameter.

9. A digital printing press comprising:
a print engine for depositing ink at a thickness that is determined at least in part by developer voltage; and
a processor for estimating the developer voltage by applying an estimation model to measured state parameters of the digital printing press.

10. The digital printing press of claim 9, wherein the print engine includes at least one BID unit, and wherein the printing press includes control hardware for controlling each BID unit at an estimated developer voltage.

11. The digital printing press of claim 9, further comprising an optical densitometer; and wherein the processor uses an output of the optical densitometer to infer ink thickness.

12. The digital printing press of claim 9, further comprising sensors for measuring different state parameters of the digital printing press; and wherein the processor uses at least some of the measurements of the different state parameters.

13. The digital printing press of claim 9, wherein the estimated developer voltage is used to print swatches at different digital dot areas, and wherein the processor computes physical dot area, and adds dot area coverage to a dot gain table.

14. The digital printing press of claim 9, wherein the print engine includes a PIP drum, a writing head and a plurality of BID units disposed about the drum, and an intermediate transfer member adjacent the PIP drum.

15. An article for the digital printing press of claim 9, the article comprising memory encoded with data for causing the processor to generate the estimation model of developer voltage from past measurements of developer voltage and the state parameters of digital printing press.

16. The article of claim 15, wherein a statistical learning system is used to generate the model from the past measurements.

17. An article comprising computer memory encoded with the estimation model of claim 15.

18. An article for the digital printing press of claim 12, the article comprising memory encoded with data for causing the processor to apply a developer voltage estimation model to current state measurements of the digital printing press, an output of the model providing an estimated developer voltage.

19. The article of claim 18, wherein the printing press includes a plurality of different BID units, and wherein a developer voltage is estimated for each BID unit.

20. The article of claim 18, wherein the data further causes the processor to use the estimated developer voltage to print swatches at different digital dot areas; and for each swatch compute physical dot area, and add dot area coverage to a dot gain table.

21. The article of claim 20, wherein the dot gain table is based on past state measurements of the digital printing press.

22. The article of claim 18, wherein the data further causes the processor to apply the estimated developer voltage to a BID unit while controlling the BID unit to deposit ink dots.

23. A method for a digital printing press, the method comprising estimating an ink thickness control parameter based on current and past measurements of at least one state parameter of the digital printing press; wherein a statistical learning system is used to generate an estimation model from the past measurements; and
wherein the model is applied to the current measurement of the at least one state parameter of the digital printing press.

* * * * *

UNITED STATES PATENT AND TRADEMARK OFFICE
CERTIFICATE OF CORRECTION

PATENT NO.      : 7,481,509 B2
APPLICATION NO. : 10/698667
DATED           : January 27, 2009
INVENTOR(S)     : Carl Staelin et al.

Page 1 of 1

It is certified that error appears in the above-identified patent and that said Letters Patent is hereby corrected as shown below:

On the Title page, in field (75), in "Inventors", in column 1, lines 6-7, delete "Eyol Shalef, Tal" and insert -- Eyal Shelef, Tel --, therefor.

In column 8, line 24, in Claim 18, delete "claim 12" and insert -- claim 9 --, therefor.

Signed and Sealed this

Nineteenth Day of May, 2009

JOHN DOLL
*Acting Director of the United States Patent and Trademark Office*